United States Patent [19]
Hall

[11] Patent Number: 5,598,314
[45] Date of Patent: Jan. 28, 1997

[54] CONTROL OF COOLING FAN BY USING POWER SUPPLY CURRENT

[75] Inventor: Steven G. Hall, Fort Collins, Colo.

[73] Assignee: Hewlett-Packard Company, Palo Alto, Calif.

[21] Appl. No.: 146,545

[22] Filed: Nov. 2, 1993

[51] Int. Cl.[6] ................................................ H02H 3/00
[52] U.S. Cl. .................................... 361/93; 361/103
[58] Field of Search .......................... 361/103, 93, 106, 361/115, 22; 324/127

[56] References Cited

U.S. PATENT DOCUMENTS

| | | | |
|---|---|---|---|
| 3,659,155 | 4/1972 | Chambers | 361/103 |
| 4,669,025 | 5/1987 | Barker | 361/103 |
| 4,706,017 | 11/1987 | Wilson | 324/127 |

*Primary Examiner*—Jeffrey A. Gaffin
*Assistant Examiner*—Stephen W. Jackson
*Attorney, Agent, or Firm*—Augustus W. Winfield

[57] ABSTRACT

A control system for a cooling fan in an electronic system. Power consumption (and therefore heat) is sensed by sensing power supply current. When power supply current exceeds a threshold value, the cooling fan is turned ON. In a specific embodiment, a small (low-resistance) series resistor is placed in the regulated output path of a power supply. Power supply current is measured by measuring the voltage drop across the resistor.

1 Claim, 2 Drawing Sheets

CONTROL OF COOLING FAN BY USING POWER SUPPLY CURRENT

FIELD OF INVENTION

This invention relates generally to electronic apparatus and more specifically to control of a cooling fan for electronics.

BACKGROUND OF THE INVENTION

Electronic instruments, computers and other electronic devices often have a fan for cooling. Fans are often noisy and consume additional power. In addition, moving air can introduce dust into an electronics assembly. Many systems do not require continuous cooling. For example, many systems have low-power stand-by or idle modes. In addition, many systems include motors or other high power devices that may run only intermittently. Therefore, it is desirable to control a cooling fan so that it is on only if necessary. Typically, a thermostat is used to turn on a fan when an internal temperature rises above a threshold level. Thermostats and associated control circuity add cost and complexity to electronics assemblies. There is a need for a simple low-cost fan ON/OFF control system.

SUMMARY OF THE INVENTION

The present invention provides a low-cost ON/OFF control system for a cooling fan. The fan is on only when the system is drawing sufficient power to cause heating. Power consumption (and therefore heat) is sensed by sensing power supply current. When power supply current exceeds a threshold value, a cooling fan is turned ON. In a specific embodiment, a small (low-resistance) series resistor is placed in the regulated output path of a power supply. Power supply current is measured by measuring the voltage drop across the resistor.

DETAILED DESCRIPTION OF THE PREFERRED EMBODIMENT OF THE INVENTION

Figure 1:
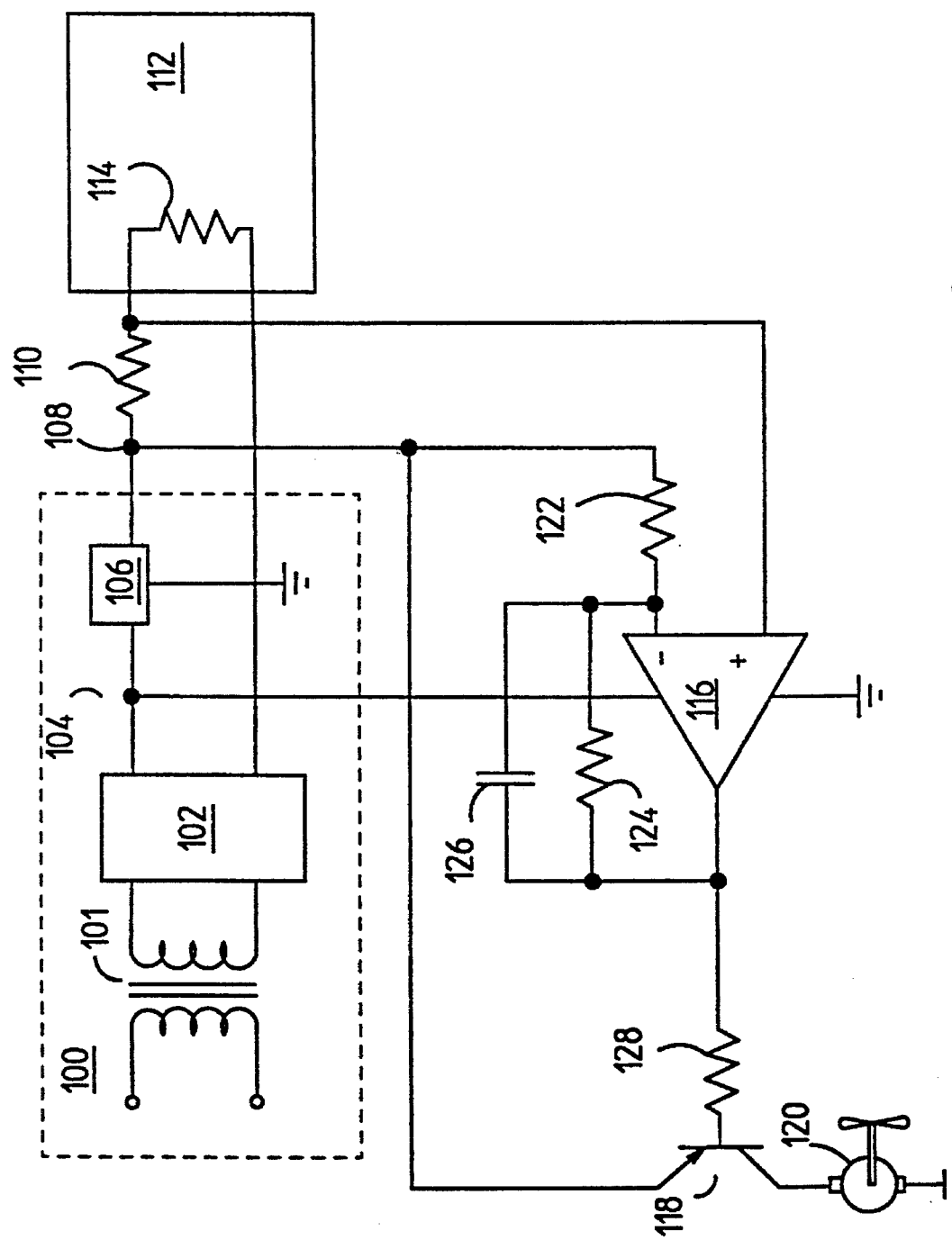
FIG. 1 is a block diagram schematic of a cooling-fan ON/OFF control circuit.

FIG. 1 illustrates a power supply and measurement of power supply output current to control a cooling fan. A linear power supply 100 typically has a step-down transformer 101 followed by pre-regulation circuitry 102. Pre-regulation circuity 102 typically comprises rectifying diodes and filter capacitors (not illustrated). A voltage regulator 106 has an unregulated DC voltage input 104 and a regulated voltage output 108. Switching power supplies may eliminate the transformer 101 but a regulated voltage 108 is still provided. The regulated voltage 108 provides power to an electronic system 112. For purposes of heat generation, the electronic system 112 is depicted in FIG. 1 as a single resistance 114. In general, the electronic system 112 may include motors and electronics that draw a variable amount of current from the power supply.

In FIG. 1, resistor 110 is in series between the power supply 100 and the electronics system 112. An operational amplifier circuit 116 measures the voltage across series resistor 110 as a measurement of current through the resistor 110 (and through resistance 114). Therefore, operational amplifier 116 indirectly measures the power being dissipated within the electronic system 112. The operational amplifier 116 controls a transistor 118 that in turn switches power to a DC fan 120. Therefore, the fan 120 is switched on only when the electronic system 112 is drawing current that exceeds a design threshold.

Resistors 122 and 124 control the gain of the operational amplifier 116. Capacitor 126 limits the frequency response to prevent noise from reaching transistor 118. The amplified voltage is applied to the base of transistor 118 through a current limiting resistor 128. Since resistor 110 is in series with the electronic system 112, it slightly reduces the voltage to the electronic system 112. Therefore, resistor 110 needs to be very small (very low resistance).

Figure 2:
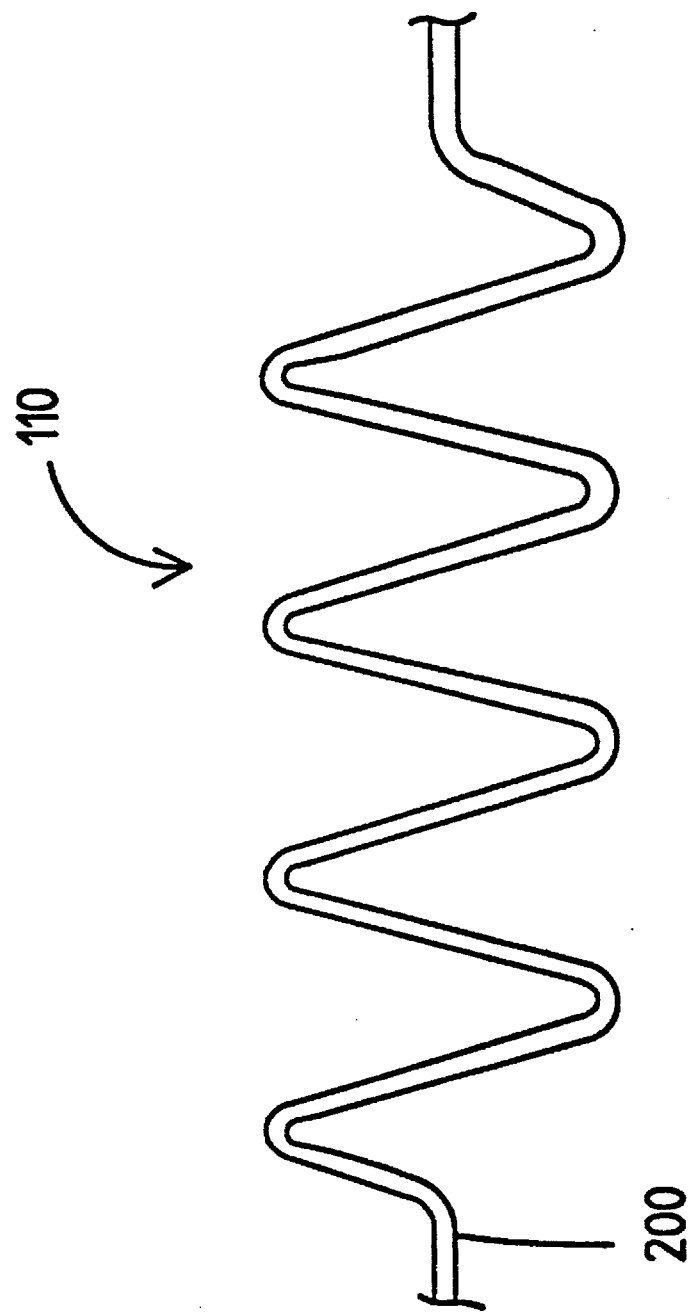
FIG. 2 is a plan view of a printed circuit board trace with length, width and thickness controlled to form a resistance.

FIG. 2 illustrates one way to implement a very low resistance resistor 110. FIG. 2 illustrates a trace 200 on a printed circuit board that has been artificially lengthened by forming the trace 200 into a "zig-zag" pattern. The overall length, width and thickness of the conductive trace 200 determines its resistance. Normal variations in plating thickness in the printed circuit board manufacturing process result in significant variation in trace resistance. In one specific embodiment, the overall resistance of a controlled length of copper trace as in FIG. 2 is 0.025 Ohm +/–0.0125 Ohm. Therefore, the gain of the operational amplifier 116 must be set so that at the desired current threshold through a worst case (lowest) resistance 110, the voltage at the base of transistor 118 exceeds the approximately 0.6 V–0.7 V base-to-emitter voltage required to turn on transistor 118. In the specific embodiment, with resistor 110 a nominal 0.025 Ohms, resistor 122 is 1 KOhm, resistor 124 is 100 KOhm, resistor 128 is 220 Ohms and capacitor 126 is 0.1 micro-Farad. Therefore, the gain of the operational amplifier circuit is 100 and the fan 120 is turned on when the voltage across resistor 110 exceeds 0.006 Volts (when the current through resistor 110 exceeds approximately 0.25 Amps).

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In an electronic system having a power supply that provides a current to the electronic system, a cooling system comprising:

a fan;

a circuit board trace having a controlled trace resistance over a portion of the trace, the circuit board trace connected in series with the power supply so that the current to the electronic system flows through the circuit board trace;

a threshold detector, connected across the controlled trace resistance, having a threshold output indicating whether a voltage across the controlled trace resistance exceeds a predetermined value; and a fan switch controller, connected to the threshold detector, in which the fan is switched on only when the threshold output indicates that the voltage across the controlled trace resistance exceeds the predetermined value.

* * * * *